United States Patent
Stevenson et al.

(10) Patent No.: US 7,138,598 B2
(45) Date of Patent: Nov. 21, 2006

(54) APPARATUS AND METHOD FOR ACCOMMODATING PART MISMATCH DURING JOINING

(75) Inventors: Robin Stevenson, Bloomfield, MI (US); Pei-Chung Wang, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/724,948

(22) Filed: Dec. 1, 2003

(65) Prior Publication Data

US 2005/0115942 A1    Jun. 2, 2005

(51) Int. Cl.
   *B23K 11/00*   (2006.01)
(52) U.S. Cl. .................... 219/117.1; 219/118
(58) Field of Classification Search ............. 219/117.1, 219/118
   See application file for complete search history.

(56) References Cited

U.S. PATENT DOCUMENTS

| | | | | |
|---|---|---|---|---|
| 2,430,083 A | * | 11/1947 | Sherman ....................... | 29/424 |
| 2,510,727 A | * | 6/1950 | Sussenbach .................. | 524/376 |
| 3,781,513 A | * | 12/1973 | Bennett .................... | 219/137 R |
| 4,195,215 A | * | 3/1980 | Clarke ...................... | 219/91.21 |
| 4,665,294 A | | 5/1987 | Hira et al. ............ | 219/121 LD |
| 4,760,240 A | | 7/1988 | Iikawa et al. ........... | 219/121.64 |
| 5,565,117 A | * | 10/1996 | Iwasa et al. ............ | 219/117.1 |
| 5,599,467 A | * | 2/1997 | Okabe et al. ................ | 219/118 |
| 5,601,736 A | | 2/1997 | Saitoh et al. ........... | 219/121.64 |
| 5,902,498 A | | 5/1999 | Mistry et al. ........... | 219/121.64 |
| 6,120,727 A | | 9/2000 | Asaka et al. .................... | 419/6 |
| 6,548,191 B1 | | 4/2003 | Osame et al. ................ | 428/654 |
| 2002/0012810 A1 | | 1/2002 | Osame et al. ................ | 428/650 |
| 2002/0142184 A1 | | 10/2002 | Mazumder et al. ......... | 428/594 |
| 2003/0038120 A1 | | 2/2003 | Minamida et al. ...... | 219/121.64 |
| 2003/0072900 A1 | | 4/2003 | Niikura et al. ............. | 428/34.1 |

OTHER PUBLICATIONS

"Duocel Aluminum Foam Metal" found at http://www.ergaerospace.com/al.htm.
"Duocel Aluminum Foam" Brochure.
"Table 4.7 Recommended Electrodes for GMAW"; Gas Metal Arc Welding, *Welding Handbook, Eight Edition*, vol. 2, Welding Processes, p. 138.
"Filler Metals"; Carbon and Low-Alloy Steels; *Welding Handbook, Eight Edition*, vol. 4, Materials and Applications Part 2, p. 3.
"Joining Aluminum"; *Metals Handbook, Ninth Edition*, vol. 2 Properties and Selection: Nonferrous Alloys and Pure Metals; pp. 193-194.

* cited by examiner

*Primary Examiner*—Len Tran
(74) *Attorney, Agent, or Firm*—Kathryn A. Marra

(57) ABSTRACT

A method of joining a pair of overlapping workpieces, the method includes: inserting a filler material between the pair of overlapping workpieces; applying a pressure to at least one of the workpieces so that the filler material is crushed; and joining the two workpieces together in a region defined by the filler material. A welded joint includes: a pair of overlapping workpieces; and a filler material that is made from a material whose comparability has been established by the American Welding Society, and the filler material is a porous material.

21 Claims, 6 Drawing Sheets

10 pores per inch 20 pores per inch 40 pores per inch

APPARATUS AND METHOD FOR ACCOMMODATING PART MISMATCH DURING JOINING

BACKGROUND

In the automotive industry, vehicle bodies are built using both aluminum and galvanized steel and assembled by welding including gas metal arc welding ("GMAW") and gas tungsten arc welding ("GTAW"). These types of welds, GMAW and GTAW, typically require a large heat input.

Laser welding is a well-established joining process that exhibits significant performance benefits, e.g. minimal distortion, high speed and minimal heat-affected-zone (HAZ). However, in order for laser welding to yield a high performance joint, the two workpieces must fit together tightly and have a minimal gap; thus, requiring very tight tolerances in spatial location and orientation of the mounting surfaces.

When assembling the frame of an automobile, the cross-members are attached to the longitudinal rails and there are typically gaps between the cross-member and the longitudinal rail. In addition, the gap size can vary over the extent of the joint and thus, the gap cannot be filled with a uniform solid filler piece. In addition, most compatible metal fillers are too rigid to elastically deform and too strong to deform plastically under normal clamping loads to fill the gap in an appropriate manner.

BRIEF SUMMARY

Disclosed herein is a method of joining a pair of overlapping workpieces, the method includes: inserting a filler material at a gap between the pair of overlapping workpieces; applying a pressure to at least one of the workpieces so that the filler material is crushed; and joining the two workpieces together in a region defined by the filler material. In addition, a welded joint includes: a pair of overlapping workpieces; and a filler material that is made from a material whose compatability has been established by the American Welding Society, and the filler material is a porous material.

The above described and other features are exemplified by the following figures and detailed description.

BRIEF DESCRIPTION OF THE DRAWINGS

Referring now to the figures, which are exemplary embodiments and wherein the like elements are numbered alike.

DETAILED DESCRIPTION

Figure 1:
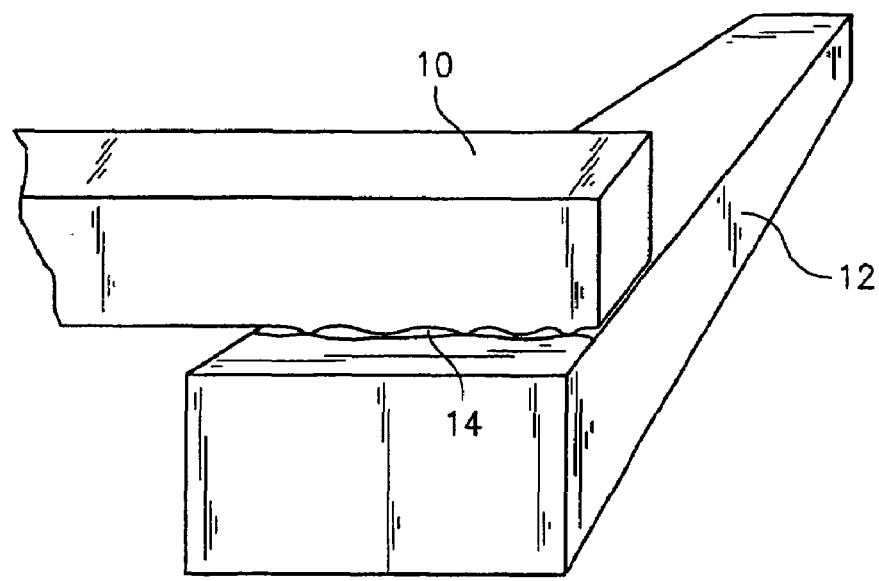
FIG. 1 is a front perspective view of two workpieces illustrating a gap between the two workpieces.

FIG. 1 illustrates two workpieces 10 and 12 that when placed on top of one another form a gap(s) 14 between the two workpieces 10 and 12. It is appreciated that the figure shows an exaggerated representation of the gap for illustrative purposes. The gap 14 can vary in size, but is typically about 0.5 millimeter to about 1.5 millimeter in size when using a cross-member and a longitudinal rail in the automotive industry. In some situations, the gap 14 may also be as large as 2 millimeters. In the automotive industry, the first workpiece 10 may be a cross-member and the second workpiece 12 may be a longitudinal rail; however, it is contemplated that the workpieces can have a wide range of shapes and sizes. In an exemplary embodiment, the cross-member and longitudinal rail may be hydroformed tubes.

Figure 2:
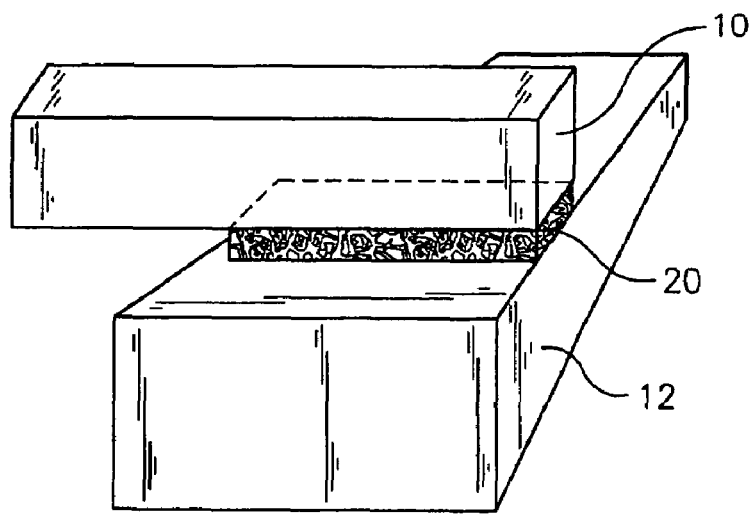
FIG. 2 is a front perspective view of two workpieces with a filler material between the two workpieces.

Referring to FIG. 2, a filler material 20 is placed between the two workpieces 10 and 12. Again, the thickness of the filler material is shown with an exaggerated thickness for illustrative purposes. The filler material 20 is deformable and/or crushable. Generally, the filler material 20 will be deformable and/or crushable because the filler material 20 is porous, which then allows the material to be deformed and/or crushed. Porous means that the material has air pockets. However, the scope of the invention includes material that is deformable and/or crushable for other reasons, such as the softness of material. In order to crush or deform the filler material 20, pressure is applied to either one or both of the workpieces 10 and 12, which can occur through a clamping method. Alternatively, the weight of workpiece 10 may also crush the filler material 20 so that the filler material is crushed.

Figure 3:
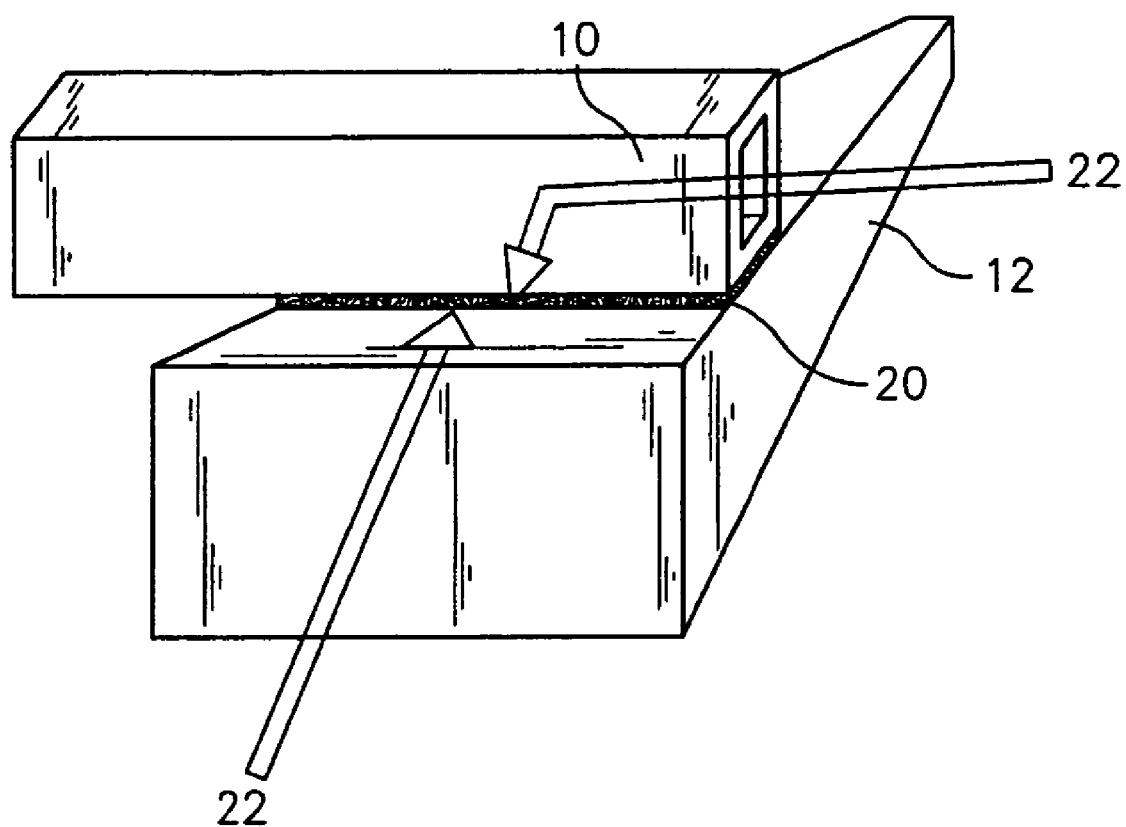
FIG. 3 is a front perspective view of two workpieces with a filler material that has been crushed between the two workpieces.
Figure 4:
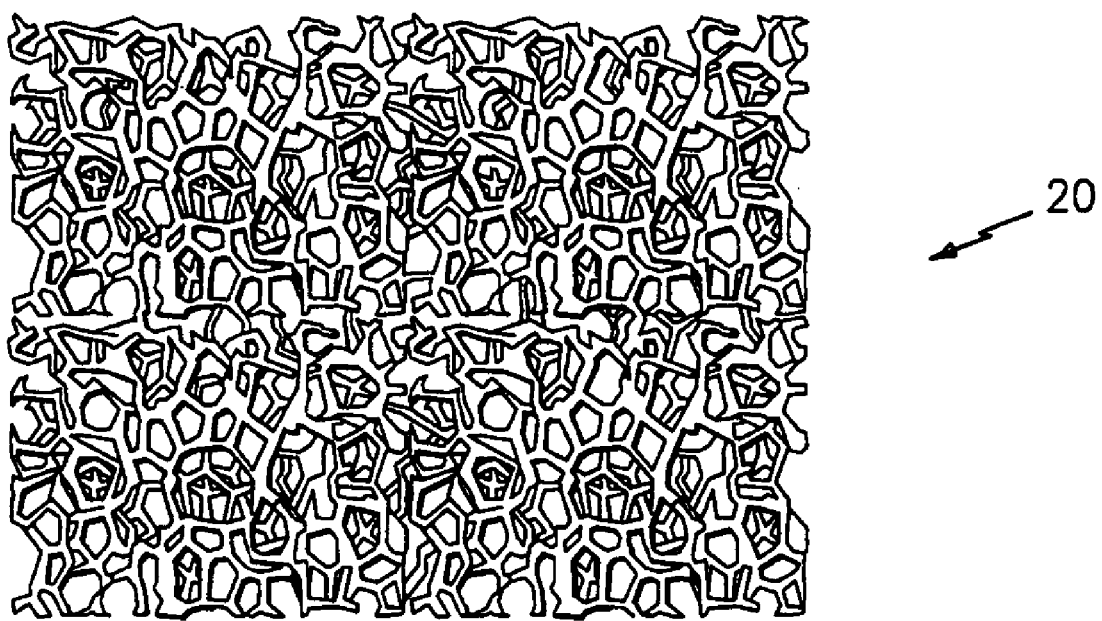
FIGS. 4–7 are exemplary embodiments of the filler material as aluminum foam.

Referring to FIG. 3, the filler material 20 fills the gap 14. Depending on the assembly operation, the filler material 20 can be inserted between workpiece 10 and workpiece 12. Alternatively, the filler material 20 can be placed on workpiece 12 and then workpiece 10 is placed on the filler material 20 and workpiece 12. Once the gap 14 is filled with filler material 20, joining is performed at the area of the filler material so as to join workpiece 10 to workpiece 12. Joining includes welding processes such as GMAW, GTAW, plasma welding, electron beam welding and laser welding.

Note that a similar process can also be used for brazing and thus, joining also includes brazing. In brazing, the need for good fit-up is mandated by the requirement that capillary action draw the braze metal deep into the joint. This combination of a large joint area and a thin layer of braze metal leads to a high strength joint. Thus poor metal fit-up can be mitigated by insertion of the compacted porous medium into the joint, thereby promoting capillary action and a high quality joint, subject only to the additional requirement that the filler material be wetted by the braze metal or braze metal and flux in combination. For this application it is desirable to use an open celled porous structure so that the braze material may also be drawn into those porous regions which remain after compaction. This will result in not only a further reduction in void volume fraction, but also, more importantly, the incorporation of the braze metal in the filler material voids will promote adhesion between individual ligaments of the filler so that it will not return to its initial (expanded) configuration when the joint is loaded.

FIG. 3 illustrates an exemplary embodiment of laser welding in the region defined by the filler material 20. A beam 22 may be directed toward the workpieces 10 and 12 and the filler material 20 from outside the workpieces. When the workpieces are tubes and have open ends, as illustrated in FIG. 3, the beam 22 may also be directed toward the workpieces 10 and 12 and the filler material 20 from inside one of the workpieces.

The filler material 20 is made of any material, so long as it can be "crushed" and is compatible with workpieces 10 and 12. "Crushed" means that the filler material is compressed and becomes plastically compact so that it will behave as a substantially solid piece. In an exemplary embodiment, the filler material 20 has characteristics of deforming plastically. When material is deformed plastically, the material does not spring back to its original shape. In addition, when material is deformed plastically, the filler material has an initially low crush strength, which makes it easy to crush the material. After crushing, the material has increased in density, which makes the material of suitable density for joining. Compatible means that the filler material is metallurgically compatible with the material of the workpieces.

Figure 5:
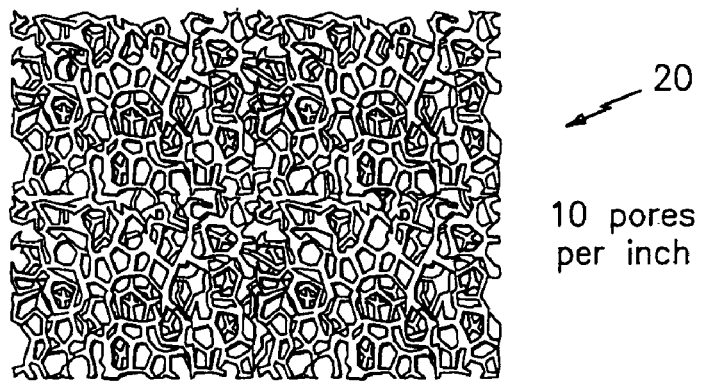
Figure 6:
Figure 7:
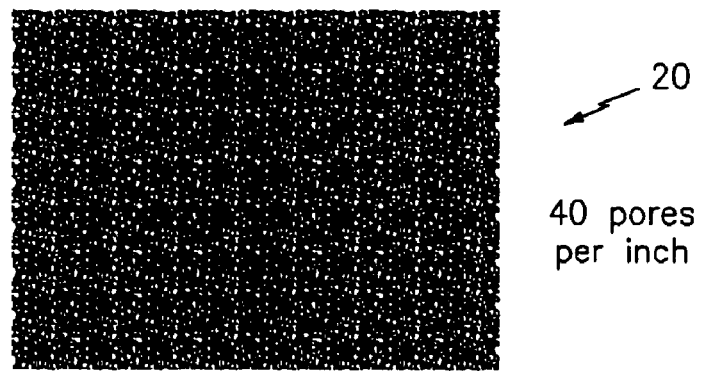

Referring to FIGS. 4–7, an exemplary embodiment of the filler material 20 as aluminum foam is illustrated. The aluminum foam has a connected, open-celled geometry in which each cell has the same shape. In an embodiment, the connected, open-celled geometry may also be continuous. Aluminum foam is available in a density range of 3% to 50% relative to the solid base metal and a cell density of 5, 10, 20, and 40 pores per linear inch. FIG. 5 illustrates 10 pores per inch, FIG. 6 illustrates 20 pores per inch, and FIG. 7 illustrates 40 pores per inch. The material density and cell size are independently variable. The aluminum foam is used when joining two aluminum workpieces together. An example of the aluminum foam is the aluminum foam Duocel made by ERG Materials and Aerospace Corporation.

This aluminum foam is a metal skeletal structure, which is manufactured by directional solidification of metal from a super-heated liquidus state in an environment of overpressures and high vacuum. The resulting material has a reticulated structure of open, duo-decahedronal-shaped cells connected by solid metal ligaments. The solid metal ligaments are not porous. The matrix of cells and ligaments is repeatable, regular, and uniform throughout the entirety of the material. Aluminum foam is also a rigid, highly porous and permeable structure and has a controlled density of metal per unit volume. Aluminum foam can be cut, turned, milled, ground, lapped, drilled, rolled, and finished. Through forming, compressing, and deforming, aluminum foam can easily conform to complex shapes.

Figure 8:
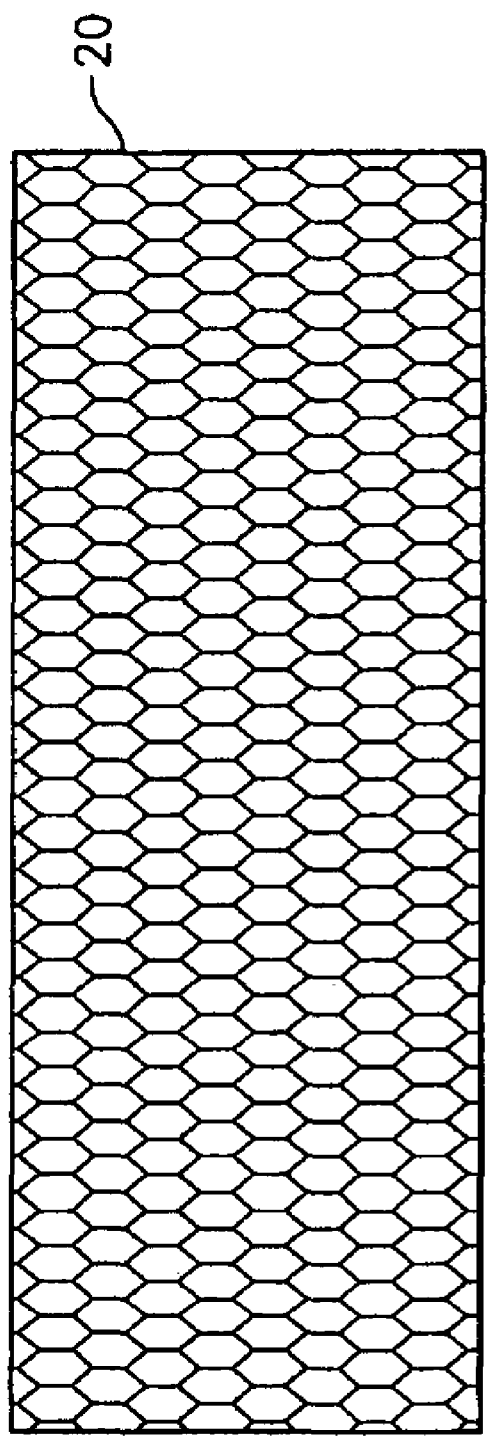
FIG. 8 is an exemplary embodiment of the filler material as aluminum honeycomb.

Referring to FIG. 8, an exemplary embodiment of the filler material 20 as aluminum honeycomb is illustrated. The aluminum honeycomb has a continuously connected, open-celled geometry in which each cell has the same shape. As with the aluminum foam, the aluminum honeycomb is available is a large range of densities and can have varying pores per linear inch. The material density and cell size are independently variable. An example of aluminum honeycomb is the aluminum honeycomb, such as Hexweb® by Hexcel Composites.

In addition, while the aluminum honeycomb structure is shown in FIG. 8, the honeycomb structure can exist with many other types of materials. Such materials include any material that is metallurgically compatible with the material of the workpieces. For example, the material of the honeycomb structure may include aluminum and aluminum alloys, magnesium alloys, copper and copper alloys, nickel and nickel alloys, titanium and titanium alloys, austenitic stainless steels, and carbon steels. Each of those materials may be appropriate for the filler material 20. Moreover, any material whose compatability has been established by the American Welding Society as an appropriate filler material may be used as a filler material for any of the above-mentioned joining processes. All that would be required to use the material as the filler material 20 would be to form the material into a porous structure, such as the honeycomb structure, which is illustrated in FIG. 8. It should also be noted that any manner of making the filler material porous is acceptable. For instance, steel wool is also an appropriate filler material in that the material is porous and is made from steel.

In addition, the American Welding Society and American Society for Metals has various handbooks, in which appropriate welding processes and filler materials are discussed. For instance three handbooks are as follows: (1) Welding Handbook, Eighth Edition, Volume 2, Welding Processes; (2) Welding Handbook, Eighth Edition, Volume 4, Materials and Applications Part 2; and (3) Metals Handbook, Ninth Edition, Volume 2, Properties and Section: Nonferrous Alloys and Pure Metals.

In an exemplary embodiment, a thickness of the filler material 20 is larger than gap 14. This allows the filler material 20 to be crushed, which then reduces the porosity of filler material 20, and modifies the aspect ratio within the filler material 20, which results in a higher density for the filler material 20. For example, assuming that the initial density of the filler material was 10%. After the filler material is inserted between the workpieces and crushed, the resulting density of the filler material would be greater than 10% and preferably would increase to 70% or above, and more preferably would increase to 90% or above. Even when the density of the filler material is at 90% or above, there will be some voids remaining; however, the voids have been reduced in size and are dispersed throughout the filler material, thereby effectively filling the gap 14 and allowing a weld to be produced in accordance with an embodiment of the invention.

For example, assume that workpieces 10 and 12 are aluminum and the filler material 20 is aluminum foam. Assume further that when workpiece 10 is placed on top of workpiece 12, the gap 14 at the intersection of workpiece 10 and workpiece 12 is 1 millimeter and that the filler material 20 is 9 millimeters thick and has a density of 10% or, stated another way, a porosity of 90%. When the filler material 20 is then inserted at the gap 14 and crushed to a thickness of 1 millimeter, its density increases to 90%, thereby effectively filling the 1 millimeter gap with a nearly solid filler.

It will be appreciated that in an embodiment of the invention, there are four variables: (1) the size of the gap; (2) the density of the filler material; (3) the thickness of the filler material; (4) the clamping pressure. In a preferred embodiment, the filler material is selected so that the resulting, crushed density of the filler material is at least 80% or higher, and more preferably at 90% or higher. The higher the density the less volume fraction of voids that are left in the filler material, after the filler material has been crushed.

Because of the four variables, the number of combinations for filling the gap with the filler material is very large. As such, the preferred approach is to standardize the filler material so that the same filler material can be used for any size gap. Standardizing the filler material allows for a more efficient, assembly operation. Thus, knowing that the resulting density is preferably at 90% or more and knowing that the gap can range from 0.5 millimeters to 2 millimeters, a filler material of set density (usually somewhere between 10% and 30%) and thickness is selected.

Figure 9:
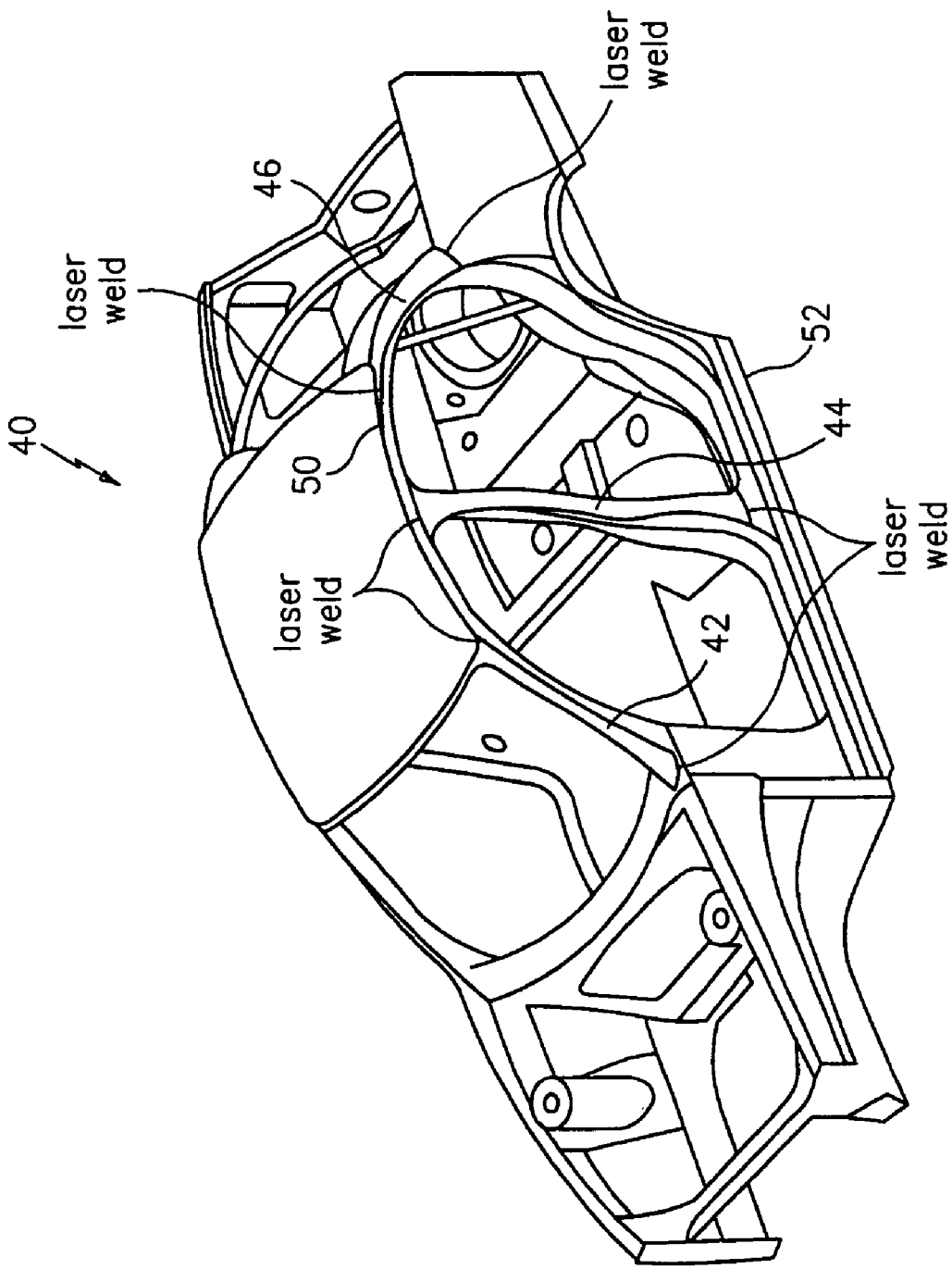
FIG. 9 is a perspective view of an automobile body.

Referring to FIG. 9, an automobile body 40 is illustrated. There are three pillars 42, 44, and 46 that extend from a roof rail 50 to a rocker panel 52. Laser welding is a preferred method of welding the three pillars 42, 44, and 46 to the roof rail 50 and to the rocker panel 52. Laser welding requires access from only one side and there is very little thermal expansion and distortion. However, when the pillars 42, 44, and 46 are lined up with the roof rail 50 and the rocker panel 52, if there are gaps between the pillars 42, 44, and 46 and the roof rail 50 and/or the pillars 42, 44, and 46 and the rocker panel 52, then the filler material 20 (see FIG. 2) can be inserted at these gaps. When the filler material is used to fill the gap, joining can be used to produce a weld in accordance with an embodiment of the invention.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A method of joining a pair of overlapping workpieces, the method comprising:
   placing a first workpiece in overlapping relation to a second workpiece, the workpieces having surface characteristics that result in one or more gaps at an interface when the workpieces are placed one on top of the other, at least one of the one more gaps having a gap dimension equal to or greater than about 0.5 millimeters and equal to or less than about 2 millimeters;
   disposing a filler material at the interface between the pair of overlapping workpieces, the filler material comprising a skeletal structure having porous regions defined by solidly connected ligaments;
   applying a pressure to at least one of the workpieces so that the filler material is crushed to substantially fill the one or more gaps; and
   joining the two workpieces together in a region defined by the filler material.

2. The method of claim 1, wherein the filler material has an initial density and after the pressure has been applied, the filler material has a final density, wherein the final density is greater than the initial density.

3. The method of claim 1, wherein an initial density of the filler material is greater than or equal to 2%.

4. The method of claim 1, wherein an initial density of the filler material is greater than or equal to 2% and less than or equal to 50%.

5. The method of claim 1, wherein, after the pressure is applied, a final density of the filler material is greater than or equal to 70% and less than 100%.

6. The method of claim 1, wherein, after the pressure is applied, a final density of the filler material is greater than or equal to 90%.

7. The method of claim 1, wherein the filler material is a porous material.

8. The method of claim 7, wherein the porous material includes a honeycomb structure or a fibrous material.

9. The method of claim 1, wherein the filler material is made from a material whose compatibility has been established by the American Welding Society.

10. The method of claim 1, wherein the filler material is material is made from a material that is metallurgically compatible with a material of the workpieces.

11. The method of claim 1, wherein joining is at least one of brazing, gas metal arc welding, gas tungsten arc welding, plasma welding, electron beam welding and laser welding.

12. The method of claim 1, wherein applying a pressure includes clamping the pair of overlapping workpieces together.

13. The method of claim 1, wherein the disposing the filler material includes:
   placing the filler material on a first workpiece; and
   placing a second workpiece on the filler material.

14. A welded joint comprising:
   a pair of overlapping workpieces, the workpieces having surface characteristics that define one or more gaps in the overlapping region at least one of the one more gaps hayine a gap dimension equal to or greater than about 0.5 millimeters and equal to or less than about 2 millimeters; and
   a filler material that is made from a material that is metallurgically compatible with the material of the workpieces, the filler material comprising a skeletal structure having porous regions defined by solidly connected ligaments, the filler material having been crushed so as to increase its density and to substantially fill the one or more gaps.

15. The joint of claim 14, wherein a density of the filler material is greater than or equal to 70%.

16. A welded joint made by the method of claim 1.

17. An automobile body with a welded joint made by the method of claim 1.

18. A method of joining a pair of overlapping workpieces, the method comprising:
   placing a first workpiece in overlapping relation to a second workpiece, the workpieces having surface characteristics that result in one or more gaps at an interface when the workpieces are placed one on top of the other, at least one of the one more gap having a gap dimension equal to or greater than about 0.5 millimeters and eqaul to or less then about 2 millimeters;
   disposing a filler material at the interface between the pair of overlapping workpieces, the filler material comprising a skeletal structure having porous regions defined by solidly connected ligaments, and having an initial density greater than or equal to 2% and less than or equal to 50%;
   applying a pressure to at least one of the workpieces so that the filler material is crushed to substantially fill the one or more gaps, wherein alter the pressure is applied, the filler material has a final density greater than or equal to 70% and less than 100%; and
   joining the two workpieces together in a region defined by the filler material.

19. The method of claim 7, wherein the porous material comprises a honeycomb structure.

20. The method of claim 1, wherein:
   the joining is brazing; and
   the brazing results in braze material being drawn into the porous filler material by capillary action, thereby promoting adhesion between individual ligaments of the filler material.

21. The method of claim 7, wherein the porous material comprises an aluminum honeycomb or aluminum foam material.

* * * * *